United States Patent
Chang et al.

(10) Patent No.: US 11,721,829 B2
(45) Date of Patent: Aug. 8, 2023

(54) RECHARGEABLE BATTERY

(71) Applicant: SAMSUNG SDI CO., LTD., Yongin-si (KR)

(72) Inventors: Donghyuk Chang, Yongin-si (KR); Bokhyun Ka, Yongin-si (KR); Kyeuyoon Sheem, Yongin-si (KR); Jinhyon Lee, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 536 days.

(21) Appl. No.: 16/465,869

(22) PCT Filed: Dec. 8, 2017

(86) PCT No.: PCT/KR2017/014374
§ 371 (c)(1),
(2) Date: May 31, 2019

(87) PCT Pub. No.: WO2018/106054
PCT Pub. Date: Jun. 14, 2018

(65) Prior Publication Data
US 2019/0305356 A1    Oct. 3, 2019

(30) Foreign Application Priority Data
Dec. 9, 2016 (KR) .................. 10-2016-0167783

(51) Int. Cl.
*H01M 10/04* (2006.01)
*H01M 4/13* (2010.01)
(Continued)

(52) U.S. Cl.
CPC ......... *H01M 10/0459* (2013.01); *H01M 4/13* (2013.01); *H01M 10/04* (2013.01);
(Continued)

(58) Field of Classification Search
None
See application file for complete search history.

(56) References Cited

U.S. PATENT DOCUMENTS

| 2004/0026239 A1* | 2/2004 | Kishimi | H01M 4/70 |
|---|---|---|---|
| | | | 204/288 |
| 2010/0015514 A1 | 1/2010 | Miyagi et al. | |

(Continued)

FOREIGN PATENT DOCUMENTS

| CN | 1240154 C | 2/2006 |
|---|---|---|
| CN | 202373668 U | 8/2012 |

(Continued)

OTHER PUBLICATIONS

International Search Report for PCT/KR2017/014374 filed on Dec. 8, 2017.

(Continued)

*Primary Examiner* — Barbara L Gilliam
*Assistant Examiner* — Angela J Martin
(74) *Attorney, Agent, or Firm* — Lee IP Law, P.C.

(57) ABSTRACT

A rechargeable battery that minimizes a current amount difference between a double-sided coated region and a single-sided coated region by increasing resistance of the single-sided coated region to be higher than that of the double-sided coated region in an electrode plate (e.g., a negative electrode plate). A rechargeable battery including: an electrode assembly including an electrode plate at opposite sides of a separator and spirally winding the separator and the electrode plates; and a pouch to accommodate the electrode assembly therein and to draw out an electrode tab connected to the electrode plates to the outside thereof. The electrode plate includes: a double-sided coated region having an active material on opposite sides of a substrate and a single-sided coated region having an active material on a single surface of the substrate, wherein resistance of the (Continued)

single-sided coated region is higher than that of the double-sided coated region.

10 Claims, 11 Drawing Sheets

(51) Int. Cl.
    *H01M 10/42*     (2006.01)
    *H02J 7/00*     (2006.01)

(52) U.S. Cl.
    CPC ....... *H01M 10/0431* (2013.01); *H01M 10/42* (2013.01); *H02J 7/0045* (2013.01)

(56) References Cited

U.S. PATENT DOCUMENTS

| | | | |
|---|---|---|---|
| 2010/0104930 A1* | 4/2010 | Kim | H01M 10/0431 429/94 |
| 2012/0107654 A1* | 5/2012 | Bhardwaj | H01M 4/1393 429/94 |
| 2013/0128415 A1* | 5/2013 | Suzuki | H01G 11/46 361/508 |
| 2014/0141303 A1* | 5/2014 | Matsushita | H01M 4/366 429/94 |
| 2016/0126528 A1 | 5/2016 | Park et al. | |
| 2016/0172680 A1 | 6/2016 | Tanaka | |
| 2016/0308250 A1* | 10/2016 | Jeong | H01M 10/4235 |

FOREIGN PATENT DOCUMENTS

| | | | | |
|---|---|---|---|---|
| CN | 102794962 | * | 11/2012 | ............ B23B 37/06 |
| CN | 202905885 U | | 4/2013 | |
| CN | 103201872 A | | 7/2013 | |
| CN | 203119046 U | | 8/2013 | |
| CN | 103825044 A | | 5/2014 | |
| CN | 104157914 A | | 11/2014 | |
| CN | 104659414 A | | 5/2015 | |
| CN | 205609666 U | | 9/2016 | |
| CN | 106207068 A | | 12/2016 | |
| JP | 2006-164773 A | | 6/2006 | |
| JP | 2016-018725 A | | 2/2016 | |
| JP | 2016-040754 A | | 3/2016 | |
| KR | 10-2014-0063416 A | | 5/2014 | |
| KR | 10-2014-0146935 A | | 12/2014 | |
| KR | 10-2015-0069883 A | | 6/2015 | |
| KR | 10-1579575 B1 | | 12/2015 | |
| KR | 10-2016-0052252 A | | 5/2016 | |
| KR | 10-2016-0072769 A | | 6/2016 | |
| WO | WO 2012/060972 A1 | | 5/2012 | |

OTHER PUBLICATIONS

Korean Office action dated May 18, 2021.
Chinese Office and Search Report dated Aug. 4, 2021.
Chinese Office action dated Mar. 31, 2022.
Chinese Office action dated Aug. 1, 2022.

* cited by examiner

FIG. 11

RECHARGEABLE BATTERY

CROSS-REFERENCE TO THE RELATED APPLICATION

This is the U.S. national phase application based on PCT Application No. PCT/KR2017/014374, filed Dec. 8, 2017, which is based on Korean Patent Application No. 10-2016-0167783, filed Dec. 9, 2016, the entire contents of all of which are hereby incorporated by reference.

TECHNICAL FIELD

The present disclosure relates to a rechargeable battery including an electrode plate having a double-sided coated region and a single-sided coated region.

BACKGROUND ART

With advancement of technology for mobile devices, demand for rechargeable batteries as energy sources has been increasing. A rechargeable battery can be repeatedly charged and discharged, unlike a primary battery.

A low-capacity rechargeable battery is used for small portable electronic devices such as a mobile phone, a notebook computer, and a camcorder, and a large-capacity rechargeable battery is used as a power supply for driving a motor such as for a hybrid car.

For example, the rechargeable battery includes an electrode assembly for charging and discharging and is formed by spirally winding a negative electrode plate, a separator, and a positive electrode plate, a pouch for accommodating the electrode assembly therein, and an electrode tab for drawing out the electrode assembly to the outside of the pouch.

For example, the negative electrode plate includes a double-sided coated region formed by coating an active material on opposite surfaces of a substrate, and a single-sided coated region formed by coating an active material on a single surface of the substrate. The negative electrode plate is formed by using a same loading level of the active material without considering the double-sided coated region and the single-sided coated region or by coating the active material in a same manner without considering whether carbon is coated on the substrate.

Therefore, resistance is reduced in the single-sided coated region as compared with the double-sided coated region, and thus a current amount difference occurs between the double-sided coated region and the single-sided coated region. A difference in the amount of charge and discharge in the negative electrode plate causes non-uniform deterioration of the negative electrode plate. This deteriorates the cycle-life of the rechargeable battery.

DISCLOSURE

Technical Problem

An exemplary embodiment of the present invention has been made in an effort to provide a rechargeable battery that minimizes a current amount difference between a double-sided coated region and a single-sided coated region by increasing resistance of the single-sided coated region to be higher than that of the double-sided coated region in an electrode plate (e.g., a negative electrode plate).

Technical Solution

An exemplary embodiment of the present invention has been made in an effort to provide a rechargeable battery in which a loading level of an active material in a single-sided coated region is higher than that of a double-sided coated region.

An exemplary embodiment of the present invention has been made in an effort to provide a rechargeable battery that improves relatively low adherence of a single-sided coated region by including a binder layer formed by pattern-coating a binder along the single-sided coated region in an electrode plate.

An exemplary embodiment of the present invention has been made in an effort to provide a rechargeable battery in which a single-sided coated region is formed by pattern-coating an active material on a single surface of a substrate to prevent the single-sided coated region from including a carbon-coating layer in an electrode plate including the carbon-coating layer.

An exemplary embodiment of the present invention has been made in an effort to provide a rechargeable battery in which orientations of a double-sided coated region and a single-sided coated region are different in an oriented electrode plate.

An exemplary embodiment of the present invention has been made in an effort to provide a rechargeable battery in which a double-sided coated region is formed of an oriented layer while a single-sided coated region is formed of a non-oriented layer, or a double-sided coated region is formed of a high oriented layer while a single-sided coated region is formed of a low oriented layer.

An exemplary embodiment of the present invention provides a rechargeable battery including: an electrode assembly formed by disposing an electrode plate at opposite sides of a separator and spirally winding the separator and the electrode plates; and a pouch configured to accommodate the electrode assembly therein and to draw out an electrode tab connected to the electrode plates to the outside thereof, wherein the electrode plate includes: a double-sided coated region formed by coating an active material on opposite sides of a substrate forming a current collector; and a single-sided coated region formed by coating an active material on a single surface of the substrate, and wherein resistance of the single-sided coated region is higher than that of the double-sided coated region.

The single-sided coated region may be disposed at at least one of a winding center of the electrode assembly 10 and an outermost wound position thereof.

The electrode plate may include: a negative electrode plate disposed on a first surface of the separator to form a negative electrode; and a positive electrode plate disposed on a second surface of the separator to form a positive electrode, and the single-sided coated region may be formed in the negative electrode plate.

A substrate of the positive electrode plate may be further spiral-wound inside the single-sided coated region of the negative electrode plate at the winding center.

The substrate of the positive electrode plate may be further spirally wound on the outermost wound position of the single-sided coated region of the negative electrode plate.

The double-sided coated region may be formed on opposite surfaces of the substrate to have a first thickness t1, and the single-sided coated region may be formed on a single surface of the substrate to have a second thickness t2 that is larger than the first thickness.

The double-sided coated region may be formed by coating an active material on opposite surfaces of the substrate, while the single-sided coated region may further include a binder layer formed by coating a binder on a single surface of the substrate, and may be formed by coating an active material on the binder layer.

The double-sided coated region may further include a carbon-coating layer on opposite surfaces of the substrate, and may be formed by coating an active material on the carbon-coating layer, while the single-sided coated region may be formed by coating an active material on a single surface of the substrate.

The double-sided coated region may be formed of an oriented layer by coating an active material on opposite surfaces of the substrate, and the single-sided coated region may be formed of a non-oriented layer by coating an active material on a single surface of the substrate.

The double-sided coated region may be formed of a high oriented layer by coating an active material on opposite surfaces of the substrate, and the single-sided coated region may be formed of a low oriented layer that is oriented less than the high oriented layer by coating an active material on a single surface of the substrate.

Advantageous Effects

As such, according to the exemplary embodiments of the present invention, it is possible to minimize the current amount difference between the double-sided coated region and the single-sided coated region by increasing resistance of the single-sided coated region to be higher than that of the double-sided coated region in the electrode plate. This may cause uniform deterioration of the electrode plate, thereby improving the cycle-life of the rechargeable battery.

MODE FOR INVENTION

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
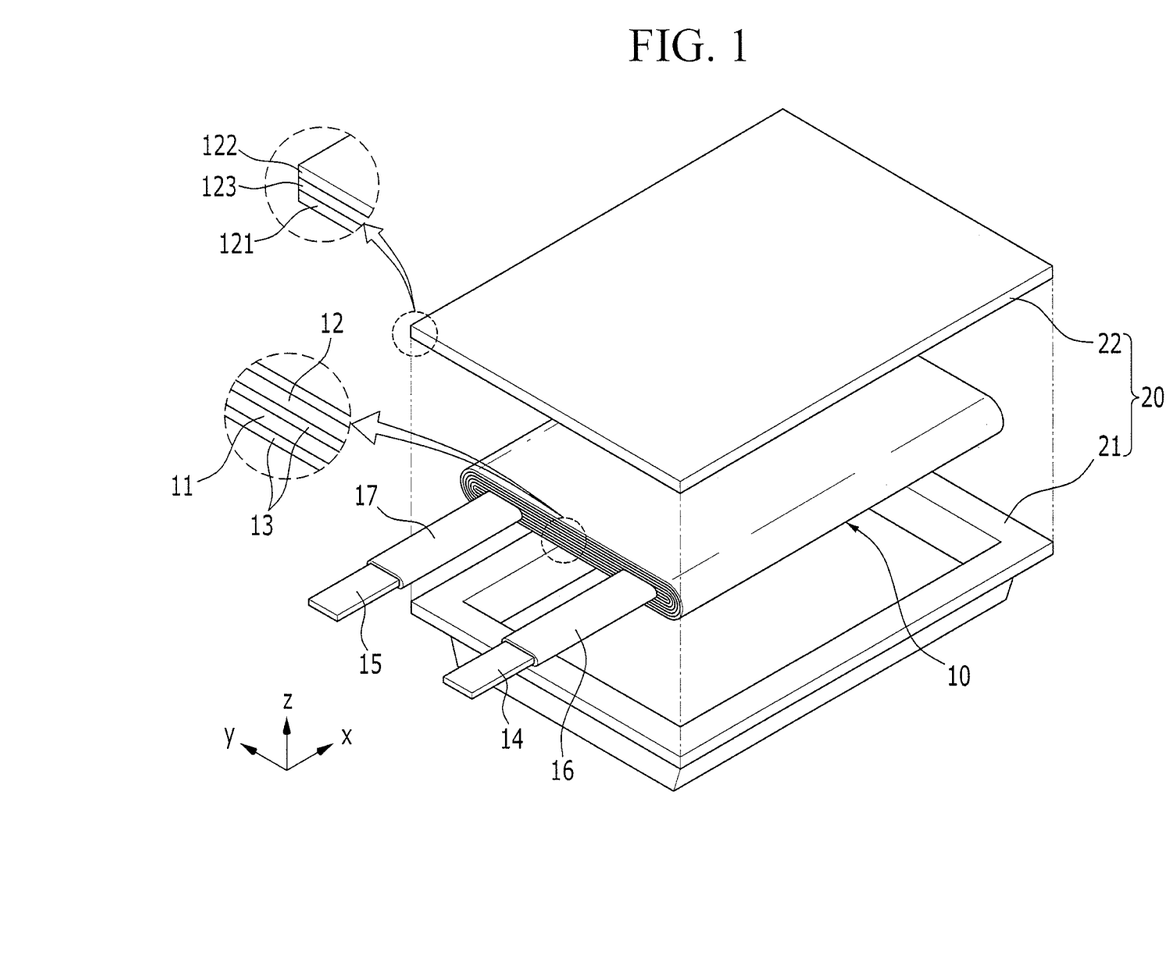
FIG. 1 illustrates an exploded perspective view of a rechargeable battery according to a first exemplary embodiment of the present invention.
Figure 2:
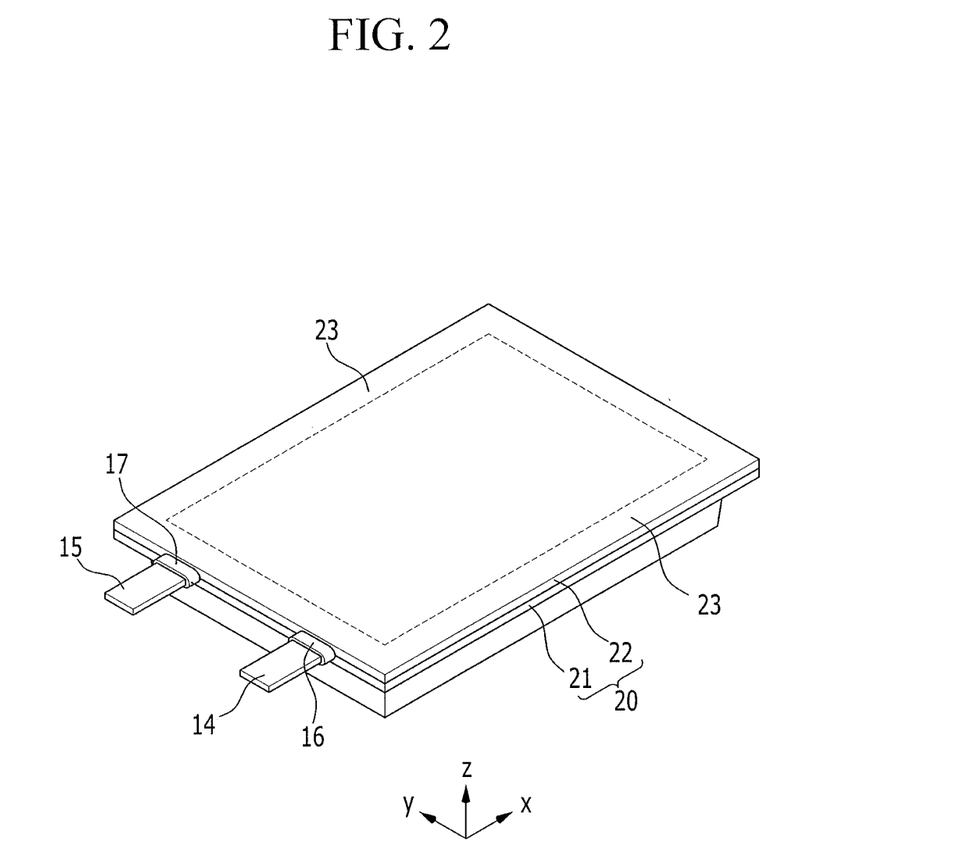
FIG. 2 illustrates a perspective view of the electrode assembly of FIG. 1, which is assembled.

FIG. 1 illustrates an exploded perspective view of a rechargeable battery according to a first exemplary embodiment of the present invention, and FIG. 2 illustrates a perspective view of the electrode assembly of FIG. 1, which is assembled. Referring to FIG. 1 and FIG. 2, according to the first exemplary embodiment, the rechargeable battery includes an electrode assembly 10 for charging and discharging a current, and a pouch 20 for accommodating the electrode assembly 10 and an electrolyte.

Figure 3:
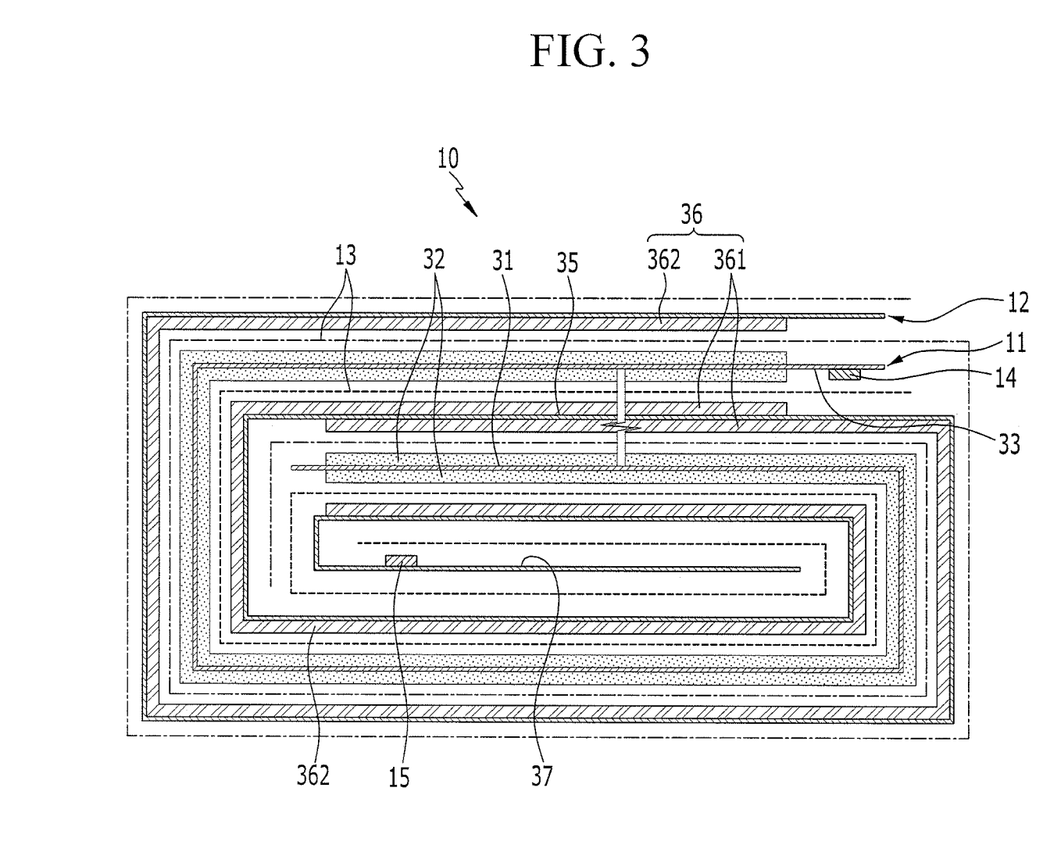
FIG. 3 illustrates a cross-sectional view of an electrode assembly, which is applied to the rechargeable battery of FIG. 1.

FIG. 3 illustrates a cross-sectional view of an electrode assembly, which is applied to the rechargeable battery of FIG. 1. Referring to FIG. 1 to FIG. 3, the electrode assembly 10 is formed by disposing a first electrode plate (referred to as a "positive electrode plate" for convenience) 11 and a second electrode plate (referred to as a "negative electrode plate" for convenience) 12 with a separator 13 therebetween, and spirally winding the positive electrode plate 11, the separator 13, and the negative electrode plate 12.

The electrode assembly 10 is formed flat by pressing side surfaces of a spirally wound cylindrical shape. The electrode assembly 10 may be drawn out to the outside of the pouch 20 through electrode tabs 14 and 15 that are respectively connected to the positive electrode plate 11 and the negative electrode plate 12 to be provided at one side or opposite sides (not illustrated) of a spiral-wound cross-section thereof.

The positive electrode plate 11 includes a coated region 32 formed by coating a positive active material on a substrate 31 that constitutes a current collector as a metal thin plate, and an uncoated region 33 exposed without applying the positive active material on the substrate 31. For example, the substrate 31 of the positive electrode plate 11 and the electrode tab 14 connected to the uncoated region 33 may be formed of a same material, e.g., aluminum (Al).

The negative electrode plate 12 includes a coated region 36 formed by coating a negative active material that is different from the active material of the positive electrode plate 11 on a substrate 35 that constitutes a current collector as a metal thin plate, and an uncoated region 37 that is exposed without applying the negative active material on the substrate 35. For example, the substrate 35 of the negative electrode plate 12 and the electrode tab 15 connected to the uncoated region 37 may be formed of a same material, e.g., nickel (Ni).

Referring again to FIG. 1 and FIG. 2, in the pouch 20, a sealing portion 23 is formed by thermally fusing outer circumferences of a first casing member 21 and a second casing member 22, which are separated or integrally connected (not illustrated). The electrode tabs 14 and 15 electrically connect the inside and the outside of the pouch 20 through the sealing portion 23. Insulation members 16 and 17 electrically insulate the electrode tabs 14 and 15 to electrically isolate the electrode tabs 14 and 15 and the pouch 20.

The pouch 20 may be formed to have a multi-layered sheet structure that surrounds the outside of the electrode assembly 10. For example, the pouch 20 includes a polymer sheet 121 that forms an inner surface to perform electrical insulation and thermal fusion, a nylon sheet 122 for forming an outer surface to perform protection, and a metal sheet 123.

The nylon sheet 122 may be replaced with a PET (polyethylene terephthalate) sheet or a PET-nylon composite sheet. The metal sheet 123 is interposed between the polymer sheet 121 and the nylon sheet 122, and may be formed of an aluminum sheet.

The pouch 20 accommodates the electrode assembly 10 into the first casing member 21 and covers the electrode assembly 10 with the second casing member 22, and the first and second casing members 21 and 22 are thermally fused on the outer side of the electrode assembly 10 to form the sealing portion 23.

The first casing member 21 are formed to have such a concave structure so as to accommodate the electrode assembly 10, and the second casing member 22 is formed to have such a flat structure so as to cover the electrode assembly 10 accommodated in the first casing member 21. The first and second casing members 21 and 22 may be formed of the polymer sheet 121, the nylon sheet 122, and the metal sheet 123 having the same layer structure.

Referring again to FIG. 3, the negative electrode plate 11 is formed as a double-sided coated region formed by coating an active material on opposite surfaces of the substrate 31. The negative electrode plate 12 includes a double-sided coated region 361 formed by coating an active material on opposite surface of the substrate 35 and a single-sided coated region 362 formed by coating an active material on one surface of the substrate 35.

In the negative electrode plate 12, the single-sided coated region 362 may be disposed at at least one of a winding center of the electrode assembly 10 and an outermost wound position. In the first exemplary embodiment, the single-sided coated region 362 of the negative electrode plate 12 is disposed at the winding center and the outermost wound position in the electrode assembly 10.

In general, resistance of the single-sided coated region is relatively low compared to the double-sided coated region in the negative electrode plate, and thus a current amount of the single-sided coated region is higher than that of the double-sided coated region. As a result, a difference in the current amounts between the double-sided coated region and the single-sided coated region is large.

In the first exemplary embodiment, the resistance of the single-sided coated region 362 is set to be higher than that of the double-sided coated region 361 in the negative electrode plate 12. Therefore, the current amount difference between the single-sided coated region 362 and the double-sided coated region 361 of the negative electrode plate 12 may be minimized. In other words, the negative electrode plate 12 is uniformly deteriorated in the single-sided coated region 362 and the double-sided coated region 361 of the negative electrode plate 12, so the cycle-life of the rechargeable battery may be improved.

Hereinafter, specific exemplary embodiments for improving the cycle-life of the rechargeable battery by minimizing the current amount difference between the single-sided coated region 362 and the double-sided coated region 361 of the negative electrode plate 12 will be described.

Figure 4:
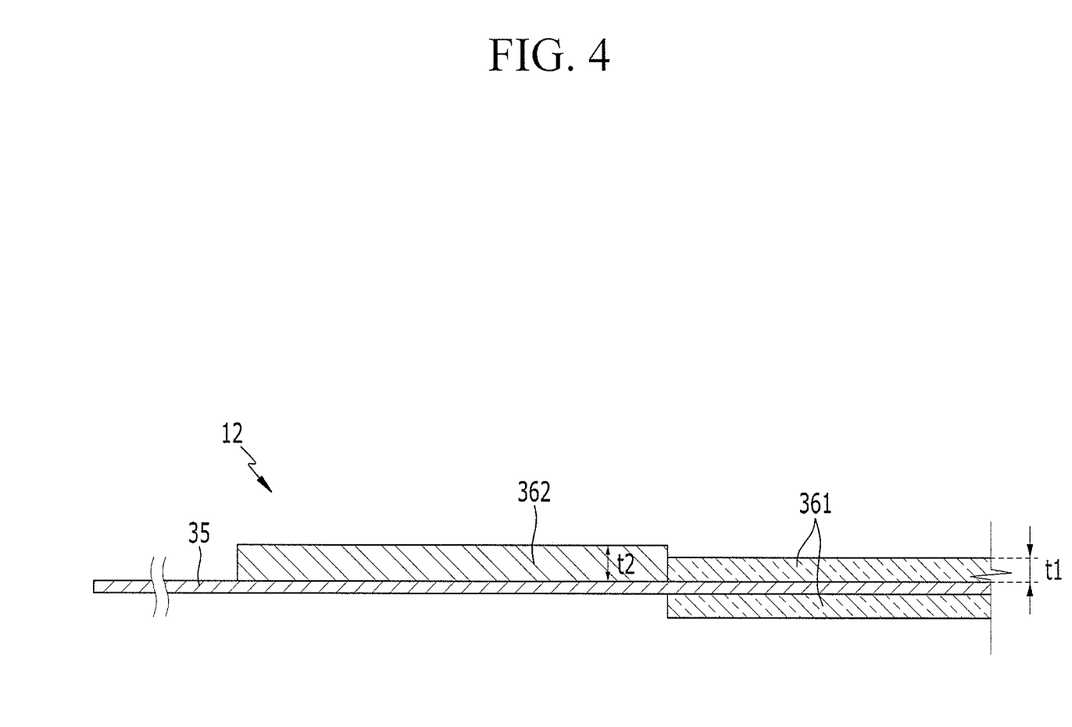
FIG. 4 illustrates a partial cross-sectional view of a negative electrode plate, which is applied to the electrode assembly of FIG. 3.

FIG. 4 illustrates a partial cross-sectional view of a negative electrode plate, which is applied to the electrode assembly of FIG. 3. Referring to FIG. 4, in the negative electrode plate 12 of the first exemplary embodiment, the double-sided coated region 361 is formed on the opposite surfaces of the substrate 35 to have a first thickness t1, and the single-sided coated region 362 is formed on the single surface of the substrate 35 to have a second thickness t2 that is larger than the first thickness t1.

The single-sided coated region 362 forms a higher loading level of the active material than the double-side coated region 361. As the loading level increases, solid content and viscosity of an active material slurry increase, and thus a contact area between the single-sided coated region 362 and the substrate 35 becomes smaller, to increase the resistance.

Since the contact area between the active material of the double-sided coated region 361 and the substrate 35 is larger than the contact area between the active material of the single-sided coated region 362 and the substrate 35 at a same current, a voltage applied to the double-sided coated region 361 is relatively low as compared with a voltage applied to the double-sided coated region 362. Therefore, the single-sided coated region 362 has higher resistance than the double-sided coated region 361.

Figure 5:
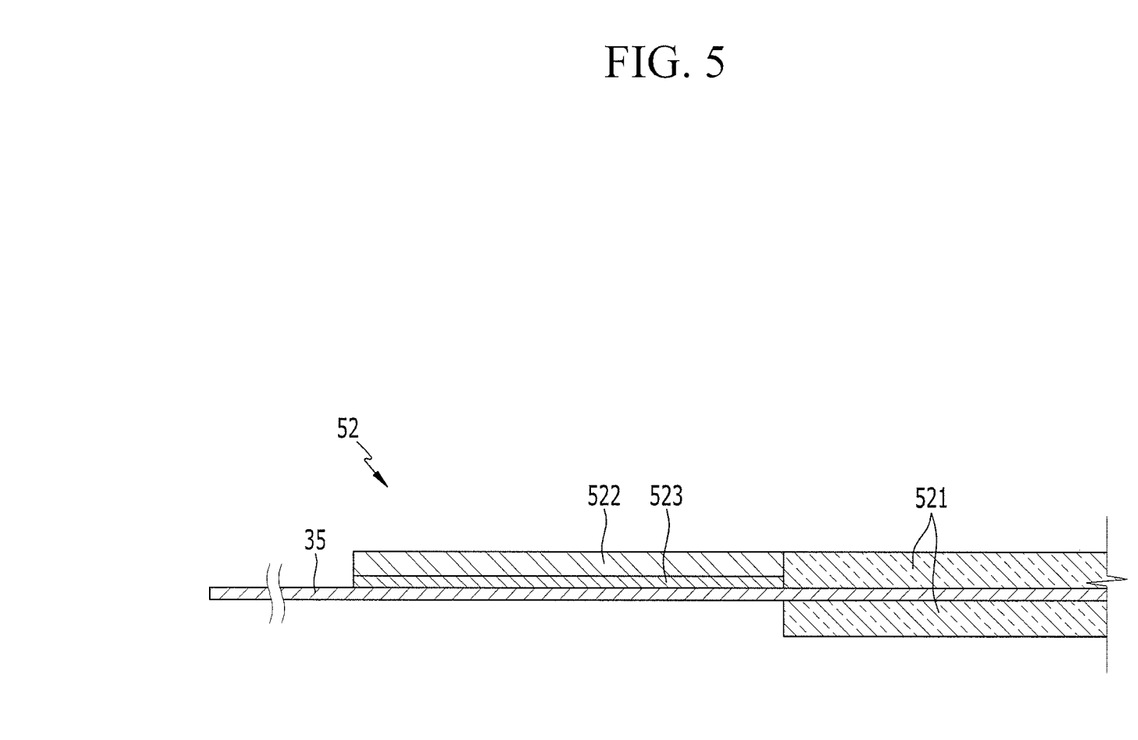
FIG. 5 illustrates a partial cross-sectional view of a negative electrode plate, which is applied to an electrode assembly of a rechargeable battery according to a second exemplary embodiment of the present invention.

FIG. 5 illustrates a partial cross-sectional view of a negative electrode plate, which is applied to an electrode assembly of a rechargeable battery according to a second exemplary embodiment of the present invention. Referring to FIG. 5, the negative electrode plate 52 of the second exemplary embodiment, a double-sided coated region 521 is formed by coating an active material on the opposite surfaces of the substrate 35, and a single-sided coated region 522 further includes a binder layer 523 formed by pattern-coating a binder on the single surface of the substrate 35. That is, the single-sided coated region 522 is formed by coating an active material on the binder layer 523.

For example, a CMC series such as sodium carboxymethyl cellulose (composition range: 1.59 g/ml (cellulose 1.5 g/ml), degree of substitution (DS): 0.6-0.8), styrene-butadiene rubber (e.g., acrylonitrile-butadiene-styrene rubber having methyl methacrylate incorporated therein), or one of these coated with itaconic acid, acrylamide, acrylonitrile, acrylic acid, methacrylic acid, 2-hydroxyethyl acrylate, or a combination thereof, may be used as the binder.

The binder layer 523 increases the resistance between the single-sided coated region 522 and the substrate 35 while increasing a binding force between the single-sided coated region 522 and the substrate 35. Therefore, the single-sided coated region 522 has higher resistance than the double-sided coated region 521.

Figure 6:
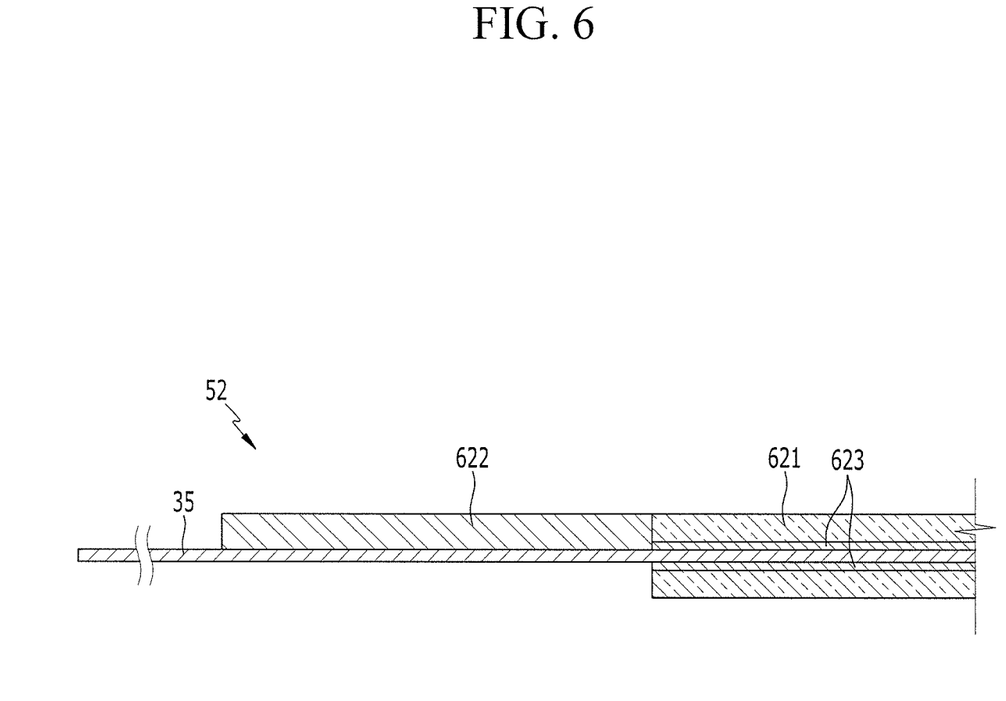
FIG. 6 illustrates a partial cross-sectional view of a negative electrode plate, which is applied to an electrode assembly of a rechargeable battery according to a third exemplary embodiment of the present invention.

FIG. 6 illustrates a partial cross-sectional view of a negative electrode plate, which is applied to an electrode assembly of a rechargeable battery according to a third exemplary embodiment of the present invention. Referring to FIG. 6, in the negative electrode plate 62 of the third exemplary embodiment, a double-sided coated region 621 further includes a carbon-coating layer 623 provided on the opposite surfaces of the substrate 35. That is, the double-sided coated region 621 is formed by coating an active material on the carbon coating layers 623. A single-sided coated region 622 is formed by pattern-coating the active material on the single surface of the substrate 35 to prevent the single-sided coated region 622 from including the carbon-coating layer.

The carbon-coating layer 623 reduces the resistance of the double-sided coated region 621 and the substrate 35. In contrast, the single-sided coated region 622 that does not include the carbon-coating layer and the substrate 35 have high resistance. Therefore, the single-sided coated region 622 has higher resistance than the double-sided coated region 621.

Figure 7:
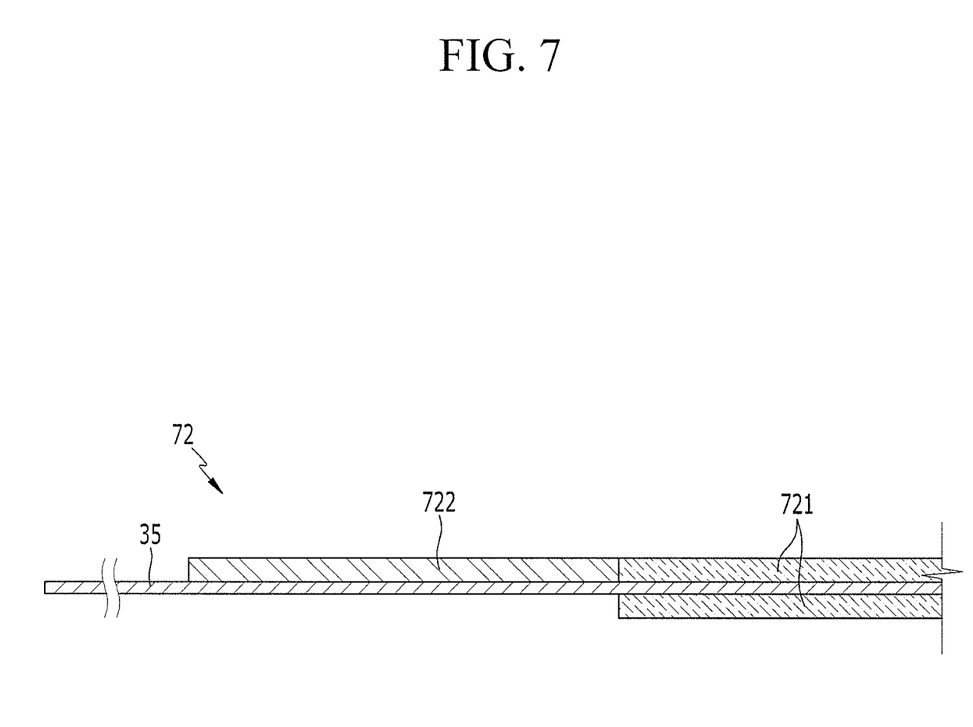
FIG. 7 illustrates a partial cross-sectional view of a negative electrode plate, which is applied to an electrode assembly of a rechargeable battery according to a fourth exemplary embodiment of the present invention.

FIG. 7 illustrates a partial cross-sectional view of a negative electrode plate, which is applied to an electrode assembly of a rechargeable battery according to a fourth exemplary embodiment of the present invention. Referring to FIG. 7, in the negative electrode plate 72 of the fourth embodiment, a double-sided coated region 721 is formed of an oriented layer by coating an active material on the opposite surfaces of the substrate 35, and a single-sided coated region 722 is formed of an non-oriented layer by coating an active material on the single surface of the substrate 35.

The oriented double-coated region 721 and the substrate 35 have low resistance. In contrast, the non-oriented single-sided coated region 722 and the substrate 35 have high resistance. Therefore, the single-sided coated region 722 has higher resistance than the double-sided coated region 721.

Figure 8:
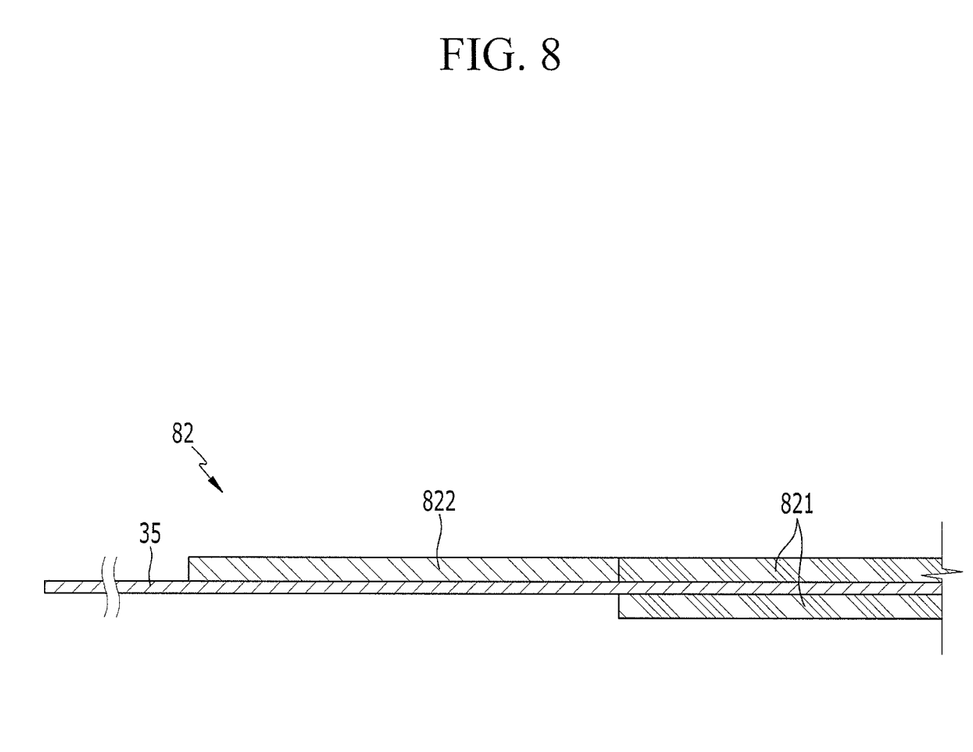
FIG. 8 illustrates a partial cross-sectional view of a negative electrode plate, which is applied to an electrode assembly of a rechargeable battery according to a fifth exemplary embodiment of the present invention.

FIG. 8 illustrates a partial cross-sectional view of a negative electrode plate, which is applied to an electrode assembly of a rechargeable battery according to a fifth exemplary embodiment of the present invention. Referring to FIG. 8, in the negative electrode plate 82 of the fifth embodiment, a double-sided coated region 821 is formed of a high oriented layer by coating an active material on the opposite surfaces of the substrate 35, and a single-sided coated region 822 is formed of a low oriented layer that is oriented less than the high oriented layer by coating an active material on the single surface of the substrate 35.

The high oriented double-coated region 821 and the substrate 35 have low resistance. In contrast, the low oriented single-sided coated region 822 and the substrate 35 have high resistance. Therefore, the single-sided coated region 822 has higher resistance than the double-sided coated region 821.

In the fourth and fifth exemplary embodiment disclosed in FIG. 7 and FIG. 8, the resistances of the single-sided coated regions 722 and 822 and the double-sided coated regions 721 and 821 are different as orientation degrees of the double-sided coated regions 721 and 821 and the single-sided coated regions 722 and 822 are different in the negative electrode plates 72 and 82.

Figure 9:
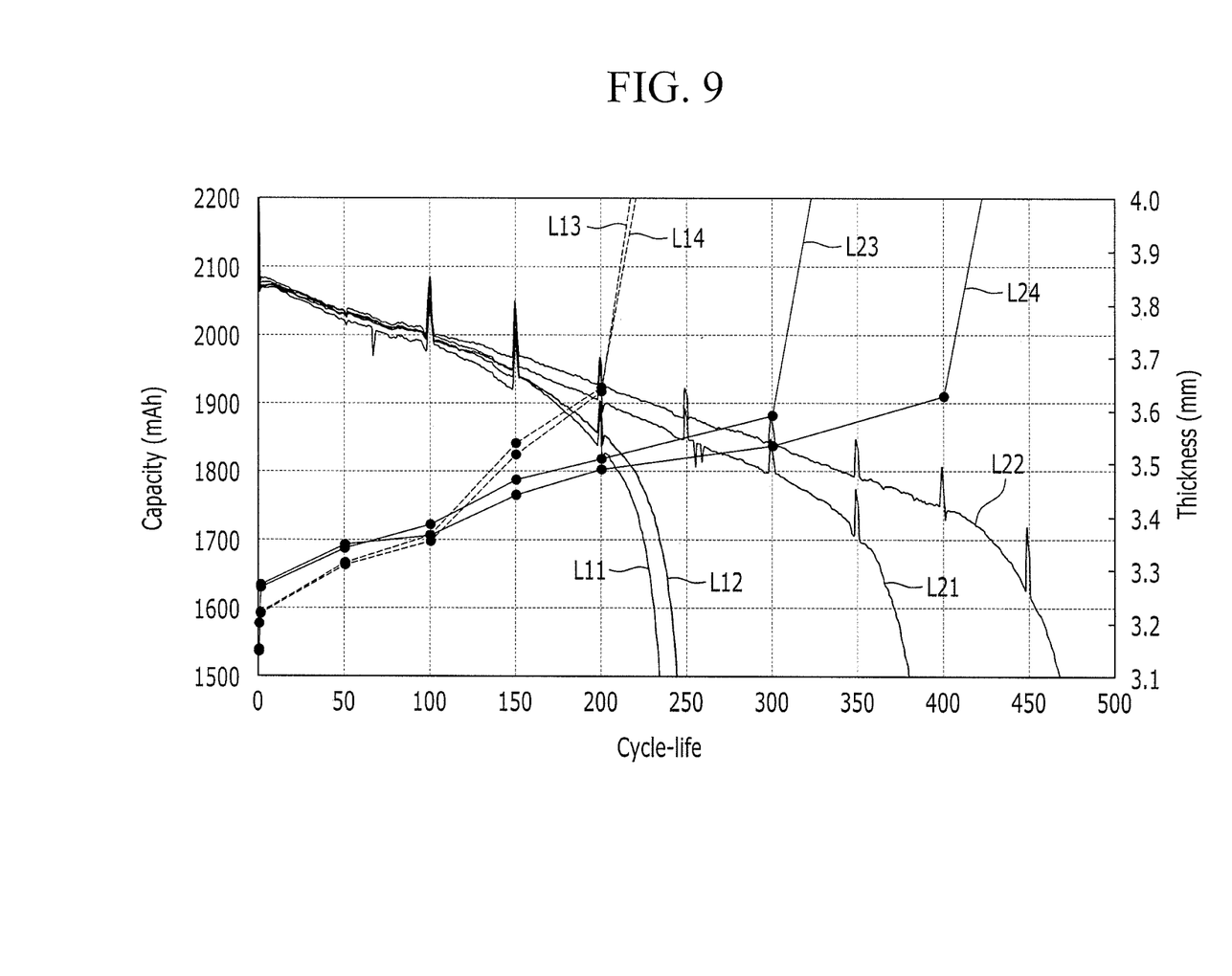
FIG. 9 illustrates a graph comparing thicknesses, capacities, and cycle-lives of single-sided coated regions of rechargeable batteries according to a conventional art (the single-sided coated region and double-sided coated region having a same thickness, the single-sided coated region including a carbon-coating layer) and the first and third exemplary embodiments of the present invention (the thickness of single-sided coated region being larger than that of the double-sided coated region, the single-sided coated region including no carbon-coating layer).

FIG. 9 illustrates a graph comparing thicknesses, capacities, and cycle-lives of single-sided coated regions of rechargeable batteries according to a conventional art (single-sided coated region and double-sided coated region having a same thickness, single-sided coated region including carbon-coating layer) and the first and third exemplary embodiments of the present invention (thickness of single-sided coated region being larger than that of double-sided coated region, single-sided coated region including no carbon-coating layer).

Referring to FIG. 9, the single-sided coated region and the double-sided coated region are formed to have a same thickness (not illustrated) in the negative electrode plate of each rechargeable battery L11 and L12 according to the conventional art, while the thickness t2 of the single-sided coated region 362 is larger than the thickness t1 of the double-sided coated region 361 in the negative electrode plate 12 in each rechargeable battery L21 and L22 according to the first exemplary embodiment (FIG. 4).

Therefore, in the first exemplary embodiment, the resistance of the single-sided coated region 362 is higher than the resistance of the double-sided coated region 361, and thus the current amount difference between the single-sided coated region 362 and the double-sided coated region 361 is minimized.

This may cause uniform deterioration of the negative electrode plate 12, thereby improving the cycle-life of the rechargeable battery. That is, the rechargeable batteries L21 and L22 according to the first exemplary embodiment (FIG. 4) have longer cycle-lives under conditions of the same capacity and the same thickness, compared to the rechargeable batteries L11 and L12 according to the conventional art.

In addition, each rechargeable battery L13 and L14 according to the conventional art includes a carbon-coating layer (not illustrated) in the single-sided coated region of the negative electrode plate, while each rechargeable battery L23 and L24 according to the third exemplary embodiment (FIG. 6) includes no carbon-coating layer in the single-sided coated region 622 of the negative electrode plate 62.

Therefore, in the third exemplary embodiment, the resistance of the single-sided coated region 622 is higher than the resistance of the double-sided coated region 621, and thus the current amount difference between the single-sided coated region 622 and the double-sided coated region 621 is minimized.

This may cause uniform deterioration of the negative electrode plate 62, thereby improving the cycle-life of the rechargeable battery. That is, the rechargeable batteries L23 and L24 according to the third exemplary embodiment (FIG. 6) have longer cycle-life under conditions of the same capacity and the same thickness, compared to the rechargeable batteries L13 and L14 according to the conventional art.

Figure 10:
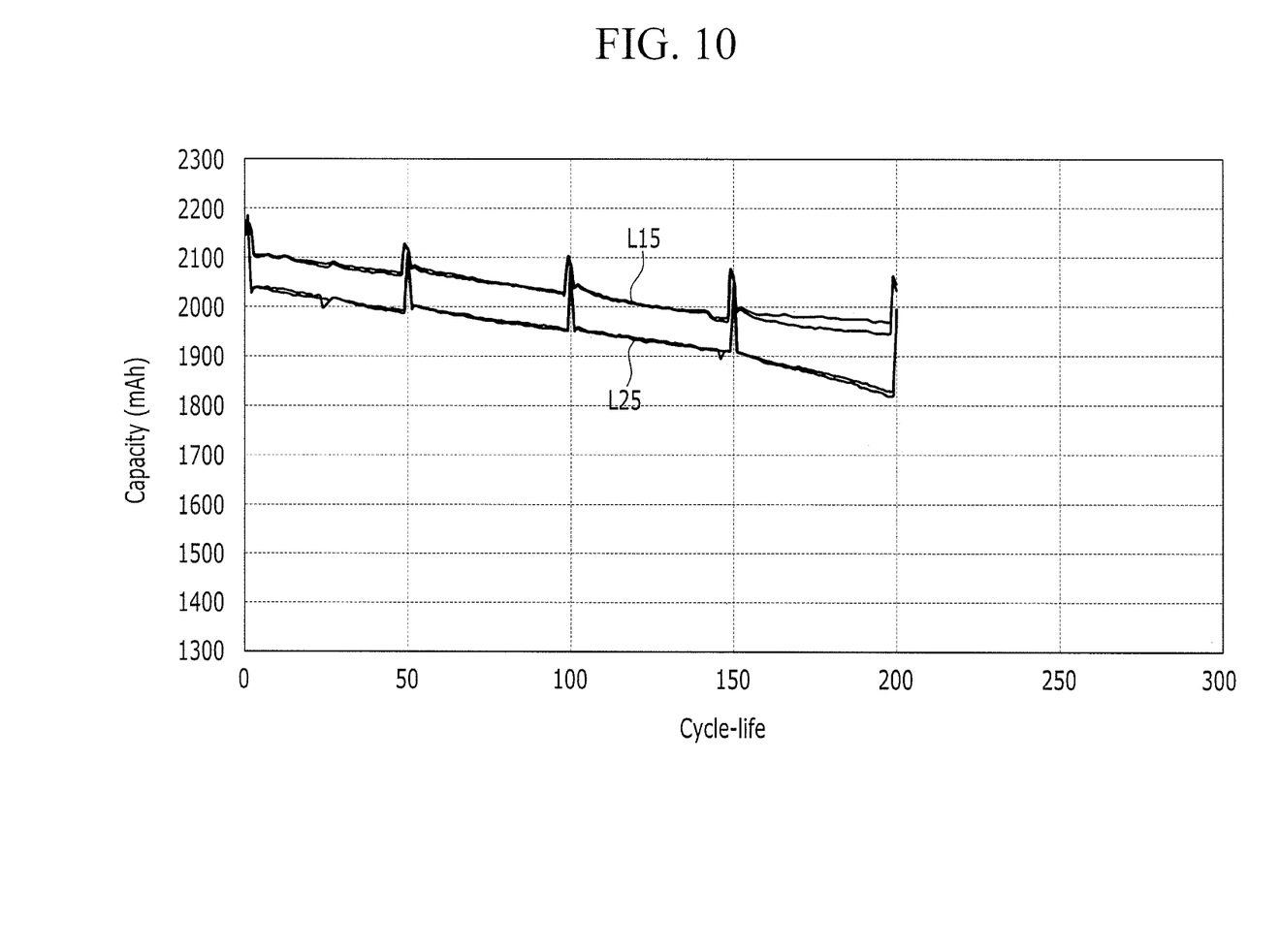
FIG. 10 illustrating a graph comparing capacities and cycle-lives of rechargeable batteries according to a conventional art (no binder layer being applied to single-sided coated region) and the second exemplary embodiment of the present invention (binder layer being applied to single-sided coated region).

FIG. 10 illustrating a graph comparing capacities and cycle-lives of rechargeable batteries according to a conventional art (no binder layer being applied to single-sided coated region) and the second exemplary embodiment of the present invention (binder layer being applied to single-sided coated region).

Referring to FIG. 10, no binder is applied to the single-sided coated region of the negative electrode plate in a rechargeable battery L25 according to the conventional art, while the binder layer 523 is applied to the single-sided coated region 522 of the negative electrode plate 52 in the rechargeable battery L15 according to the second exemplary embodiment. Therefore, in the second exemplary embodiment, the resistance of the single-sided coated region 522 is higher than the resistance of the double-sided coated region 521, and thus the current amount difference between the single-sided coated region 522 and the double-sided coated region 521 is minimized.

This may cause uniform deterioration of the negative electrode plate 52, thereby improving the cycle-life of the rechargeable battery. That is, the rechargeable battery L15 according to the second exemplary embodiment (FIG. 5) has high capacity, that is, a high current amount, under a condition of the same cycle-life, compared to the rechargeable battery L25 according to the conventional art.

Figure 11:
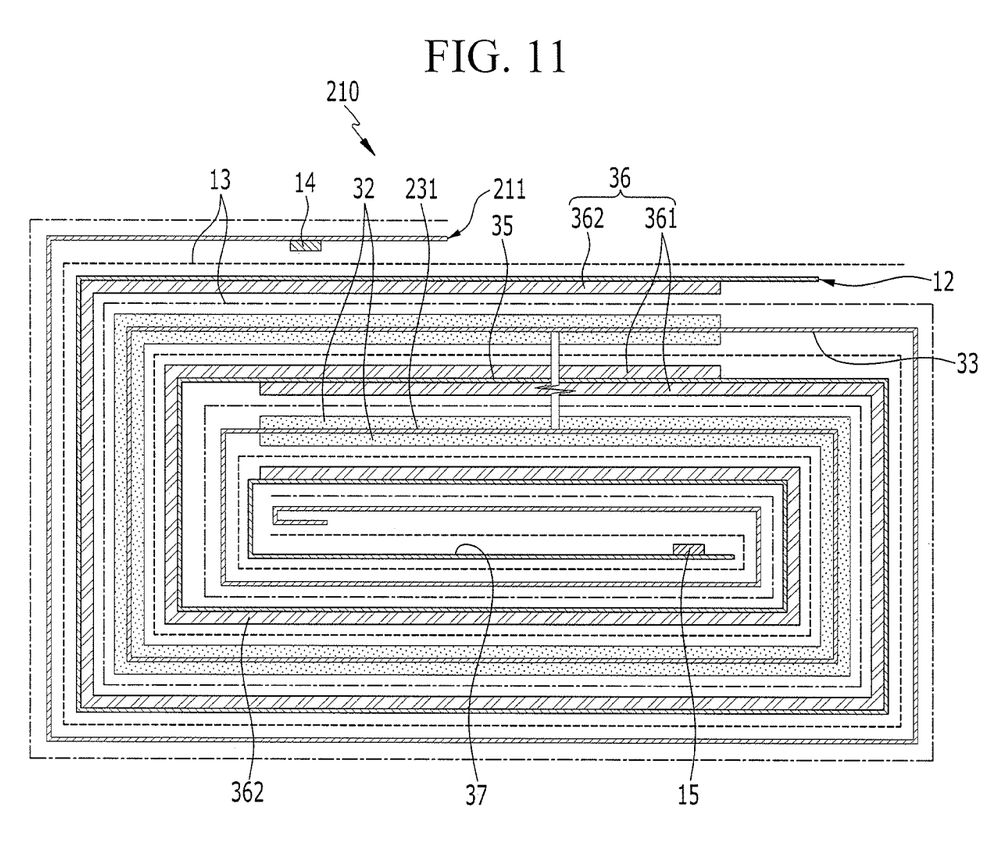
FIG. 11 illustrates a cross-sectional view of an electrode assembly, which is applied to the rechargeable battery of FIG. 1 according to a modified exemplary embodiment.

FIG. 11 illustrates a cross-sectional view of an electrode assembly, which is applied to the rechargeable battery of FIG. 1 according to a modified exemplary embodiment.

Referring to FIG. 11, in the exemplary electrode assembly 210 of the modified exemplary embodiment, a substrate 231 of a positive electrode plate 211 may be further spiral-wound inside the single-sided coated region 362 of the negative electrode plate 12 at the winding center. Further, the substrate 231 of the positive electrode plate 211 is further spirally wound on the outermost wound position of the single-sided coated region 362 of the negative electrode plate 12.

Since the substrate 231 of the positive electrode plate 211 is further extended from at least one of the winding center and the outermost wound position of the electrode assembly 210, when a conductive member (not illustrated) extends through the rechargeable battery, it is possible to increase the number of short-circuit points.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 10, 210: electrode assembly | 11, 211: first electrode plate (positive electrode plate) |
| 12: second electrode plate (negative electrode plate) | 13: separator |
| 14, 15: electrode tab | 20: pouch |
| 21: first casing member | 22: second casing member |
| 23: sealing portion | 31, 35, 231: substrate |
| 32, 36: coated region | 33, 37: uncoated region |
| 52, 62, 72, 82: negative electrode plate | 121: polymer sheet |
| 122: nylon sheet | 123: metal sheet |
| 361, 521, 621, 721, 821: double-sided coated region | |
| 362, 522, 622, 722, 822: single-sided coated region | |
| 523: binder layer | 623: carbon-coating layer |
| L11, L12, L13, L14, L25: rechargeable battery of conventional art | |
| L21, L22, L23, L24: rechargeable battery of first exemplary embodiment | |
| L15: rechargeable battery of second exemplary embodiment | |
| t1, t2: first, second thickness | |

The invention claimed is:

1. A rechargeable battery, comprising:
an electrode assembly formed by disposing an electrode plate at opposite sides of a separator and spirally winding the separator and the electrode plate; and
a pouch configured to accommodate the electrode assembly therein and to draw out an electrode tab connected to the electrode plate to the outside thereof,
wherein the electrode plate includes:
a double-sided coated region including an active material on opposite sides of a substrate forming a current collector; and
a single-sided coated region including an active material on a single surface of the same substrate as the double-sided coating region, and
wherein resistance of the single-sided coated region is higher than that of the double-sided coated region.

2. The rechargeable battery as claimed in claim 1, wherein the single-sided coated region is disposed at at least one of a winding center of the electrode assembly and an outermost wound position thereof.

3. The rechargeable battery as claimed in claim 1, wherein the electrode plate includes:
a negative electrode plate disposed on a first surface of the separator to form a negative electrode; and a positive electrode plate disposed on a second surface of the separator to form a positive electrode, and
the single-sided coated region is formed in the negative electrode plate.

4. The rechargeable battery as claimed in claim 3, wherein a substrate of the positive electrode plate is further spiral-wound inside the single-sided coated region of the negative electrode plate at the winding center.

5. The rechargeable battery as claimed in claim 3, wherein a substrate of the positive electrode plate is further spirally wound on the outermost wound position of the single-sided coated region of the negative electrode plate.

6. The rechargeable battery as claimed in claim 1, wherein the active material on both sides in the double-sided coated region have a first thickness, and
the active material in the single-sided coated region has a second thickness that is larger than the first thickness.

7. The rechargeable battery as claimed in claim 1, wherein the double-sided coated region includes the active material directly on opposite surfaces of the substrate, and
the single-sided coated region further includes a binder layer, wherein the active material is on the binder layer.

8. The rechargeable battery as claimed in claim 1, wherein the double-sided coated region further includes a carbon-coating layer on opposite surfaces of the substrate, wherein the active material in the double-sided coated region is on the carbon-coating layer, and
the active material in the single-sided coated region is directly on the single surface of the substrate.

9. The rechargeable battery as claimed in claim 1, wherein the active material on both sides in the double-sided coated region are oriented layers, and
the active material in the single-sided coated region is a non-oriented layer.

10. The rechargeable battery as claimed in claim 1, wherein
the active material on both sides in the double-sided coated region are high oriented layers, and
the active material in the single-sided coated region is a low oriented layer that is oriented less than the high oriented layers.

* * * * *